United States Patent
Veit et al.

(10) Patent No.: US 8,051,015 B2
(45) Date of Patent: Nov. 1, 2011

(54) METHOD AND SYSTEM FOR AUTOMATED CONTROL OF PRICING

(75) Inventors: Thomas Veit, Kirchheimbolanden (DE); Ines Wannemacher, Saarbrucken (DE); Susanne Ziehl, Blieskastel (DE); Thomas Roth, Norderstedt (DE)

(73) Assignee: SAP AG (DE)

( * ) Notice: Subject to any disclaimer, the term of this patent is extended or adjusted under 35 U.S.C. 154(b) by 39 days.

(21) Appl. No.: 10/900,975

(22) Filed: Jul. 28, 2004

(65) Prior Publication Data

US 2005/0197897 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 99/00* (2006.01)

(52) U.S. Cl. ...... 705/400; 705/1.1; 705/7.35; 705/14.35

(58) Field of Classification Search ............ 705/37, 705/1, 10, 26, 25, 28, 400, 1.1, 7–8, 7.35, 705/14.35; 706/46

See application file for complete search history.

(56) References Cited

U.S. PATENT DOCUMENTS

| | | | | |
|---|---|---|---|---|
| 5,400,253 A * | 3/1995 | O'Connor | ...... | 701/123 |
| 5,615,109 A | 3/1997 | Eder | | |
| 5,689,696 A | 11/1997 | Gibbons et al. | | |
| 5,930,771 A * | 7/1999 | Stapp | ...... | 705/28 |
| 5,933,813 A * | 8/1999 | Teicher et al. | ...... | 705/26 |
| 6,507,851 B1 | 1/2003 | Fujiwara et al. | | |
| 6,910,017 B1 * | 6/2005 | Woo et al. | ...... | 705/10 |
| 6,976,001 B1 | 12/2005 | Levanoni et al. | | |

(Continued)

FOREIGN PATENT DOCUMENTS

JP   2004-030343 A   1/2004

OTHER PUBLICATIONS

Subrahmanyan, Saroja, "Developing optimal pricing and inventory policies for retailers who face uncertain demand", Spring 1996, Journal of Retailing, v72, n1, p. 7 (24).*

(Continued)

*Primary Examiner* — John Hayes
*Assistant Examiner* — Freda A Nelson
(74) *Attorney, Agent, or Firm* — Foley & Lardner LLP

(57) ABSTRACT

A method, program product and system for automated control of pricing of a product or service. The method includes determining an initial price of the product, monitoring actual sales of the product at retail outlets, and adjusting the initial price during a selling season of the product based on the actual sales of the product. The method can further include accepting input from a historical price database, and determining the initial price using historical prices of the product or a similar product. The method can further include repeatedly adjusting a price of the product during a selling season based on the actual sales of the product. The method can further include applying a markdown to the price of the product and using a markdown profile to determine the markdown. The method can further include performing slow seller analysis to determine the markdown. The determination that a product is a slow seller can be made by applying a predetermined rule set to the product.

15 Claims, 4 Drawing Sheets

U.S. PATENT DOCUMENTS

| | | | |
|---|---|---|---|
| 6,980,966 B1 | 12/2005 | Sobrado et al. | |
| 7,080,066 B1 | 7/2006 | Scheurich et al. | |
| 7,082,066 B2 | 7/2006 | Yamada | |
| 7,092,402 B1 | 8/2006 | Smith et al. | |
| 7,092,929 B1* | 8/2006 | Dvorak et al. | 705/28 |
| 7,117,165 B1 | 10/2006 | Adams et al. | |
| 7,130,822 B1 | 10/2006 | Their et al. | |
| 7,139,731 B1 | 11/2006 | Alvin | |
| 7,155,402 B1 | 12/2006 | Dvorak | |
| 7,379,890 B2 | 5/2008 | Myr et al. | |
| 7,424,440 B1 | 9/2008 | Gupta et al. | |
| 7,516,083 B1* | 4/2009 | Dvorak et al. | 705/7.31 |
| 2001/0032128 A1 | 10/2001 | Kepecs | |
| 2001/0047308 A1 | 11/2001 | Kaminsky et al. | |
| 2001/0049690 A1 | 12/2001 | McConnell et al. | |
| 2002/0023500 A1 | 2/2002 | Chikuan et al. | |
| 2002/0059108 A1 | 5/2002 | Okura et al. | |
| 2002/0078159 A1 | 6/2002 | Petrogiannis et al. | |
| 2002/0107713 A1 | 8/2002 | Hawkins | |
| 2002/0123930 A1 | 9/2002 | Boyd et al. | |
| 2002/0138336 A1* | 9/2002 | Bakes et al. | 705/10 |
| 2002/0147668 A1 | 10/2002 | Smith et al. | |
| 2003/0023500 A1* | 1/2003 | Boies et al. | 705/26 |
| 2003/0028437 A1* | 2/2003 | Grant et al. | 705/26 |
| 2003/0046195 A1 | 3/2003 | Mao | |
| 2003/0158791 A1 | 8/2003 | Gilberto et al. | |
| 2003/0172007 A1 | 9/2003 | Helmolt et al. | |
| 2003/0229502 A1* | 12/2003 | Woo | 705/1 |
| 2004/0034580 A1* | 2/2004 | Okamura | 705/28 |
| 2004/0098358 A1* | 5/2004 | Roediger | 706/46 |
| 2004/0162763 A1 | 8/2004 | Hoskin et al. | |
| 2004/0186783 A1* | 9/2004 | Knight et al. | 705/16 |
| 2004/0199536 A1 | 10/2004 | Barnes Leon et al. | |
| 2004/0220861 A1 | 11/2004 | Morciniec et al. | |
| 2005/0055283 A1 | 3/2005 | Zarovinsky | |
| 2005/0060270 A1* | 3/2005 | Ramakrishnan | 705/400 |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0197946 A1 | 9/2005 | Williams et al. | |
| 2006/0036507 A1 | 2/2006 | Pujar et al. | |
| 2007/0276537 A1 | 11/2007 | Walker et al. | |

OTHER PUBLICATIONS http://web.archive.org./web/2002060311838/http://profitlogic.com/.*

Profitlogic.com.*

Mantrala, Murali K.; Tandon, Mridul K; "An Implementable Approach for Optimizing Department Store Markdown Decisions", Apr. 1994, Stores, v76n4, pp. RR1-RR6.*

Smith, Stephen A; Agrawal, Narenda; McIntyre, Shelby H; "A Discrete Optimization Model for Seasonal Merchandise Planning", Summer, 1998; Journal of Retailing, v74, n2, p. 193 (29).*

Malone, Scott; "The 'New' Buyer: Creativity Takes Back Seat to Biz", Mar. 31, 1997; Footwear News, v53, n13, p. 1.*

Mantrala, Murali K; Rao, Surya; "A Decision-Support System that Helps Retailers Decide Order Quantities and Markdowns for Fashion Goods", May/Jun. 2001; Interfaces, p. S146-S165.*

U.S. Appl. No. 60/374,892, filed Apr. 22, 2002, Krajec, Russell.

ProfitLogic, available at http://web.archive.org/web/2002060311838/http://profitlogic.com/, available at least by Apr. 15, 2005 (22 pp.).

Subrahmanyan et al., "Developing optimal pricing and inventory policies for retailers who face uncertain demand", *Journal of Retailing*, vol. 72, No. 1, Spring, 1996 (p. 7 (24)).

Author unknown, "Staffware: Staffware and Biomni join forces to provide end-to-end e-Procurement solution with enhanced workflow capability: Self-service functionality with enable thousands of transactions to be handled daily from the desktop," *M2 Presswire.*, Coventry: Feb. 6, 2001 (2 pgs.).

"Beyond Markdown Management", *the 4caster*, Issue 4, vol. 2, summer/autumn 03 (4 pgs.).

Melcer, Rachel, "Local tech firm creates retail markdown tool", *Cincinnati Business Courier*, Mar. 24, 2000 (3 pgs.).

"Retailers Manage Markdown Challenges Using i2 Solutions", *NFR 92nd Annual Convention & Expo—New York*, Jan. 13, 2003 (2 pgs.).

Achabal, Dale D., PhD, Achieving Business Advantage in Retail Through Advanced Analytics, 2003 Milan Meeting of the Minds, infosys.com/Milan, 31 pages.

Notice of Allowance for U.S. Appl. No. 10/919,025, mail date Sep. 18, 2008, 4 pages.

Office Action for U.S. Appl. No. 10/872,816, mail date Aug. 27, 2007, 9 pages.

Office Action for U.S. Appl. No. 10/872,816, mail date Feb. 4, 2009, 15 pages.

Office Action for U.S. Appl. No. 10/872,816, mail date Jul. 23, 2009, 9 pages.

Office Action for U.S. Appl. No. 10/872,816, mail date Mar. 17, 2008, 11 pages.

Office Action for U.S. Appl. No. 10/872,816, mail date Mar. 24, 2010, 20 pages.

Office Action for U.S. Appl. No. 10/872,816, mail date Sep. 2, 2008, 12 pages.

Office Action for U.S. Appl. No. 10/900,995, mail date Apr. 17, 2008, 14 pages.

Office Action for U.S. Appl. No. 10/900,995, mail date Mar. 22, 2007, 14 pages.

Office Action for U.S. Appl. No. 10/900,995, mail date May 20, 2009, 20 pages.

Office Action for U.S. Appl. No. 10/900,995, mail date Oct. 28, 2008, 15 pages.

Office Action for U.S. Appl. No. 10/900,995, mail date Oct. 4, 2007, 15 pages.

Office Action for U.S. Appl. No. 10/900,995, mail date Oct. 5, 2009, 14 pages.

Office Action for U.S. Appl. No. 10/903,891, mail date Apr. 25, 2005, 12 pages.

Office Action for U.S. Appl. No. 10/903,891, mail date Apr. 7, 2006, 10 pages.

Office Action for U.S. Appl. No. 10/903,891, mail date May 4, 2007, 17 pages.

Office Action for U.S. Appl. No. 10/903,891, mail date Oct. 10, 2006, 17 pages.

Office Action for U.S. Appl. No. 10/903,891, mail date Oct. 21, 2005, 9 pages.

Office Action for U.S. Appl. No. 10/919,025, mail date Feb. 28, 2007, 7 pages.

Office Action for U.S. Appl. No. 10/919,025, mail date Mar. 21, 2008, 12 pages.

Office Action for U.S. Appl. No. 10/919,025, mail date Sep. 25, 2007, 11 pages.

Office Action for U.S. Appl. No. 10/931,936, mail date Apr. 10, 2009, 15 pages.

Office Action for U.S. Appl. No. 10/931,936, mail date Mar. 25, 2010, 23 pages.

Office Action for U.S. Appl. No. 10/931,936, mail date Nov. 24, 2009, 22 pages.

Sun and ProfitLogic Help Leading Retailer Optimize Markdowns to Increase Profits, Apr. 2003, Onthewebsun.com/retail, 4 pages.

Elmaghraby et al., "Analysis of a Price Markdown", 2001, pp. 170-177, 8 pages.

Lapide, Larry, "A Simple Approach for Short Product Lifecycle Forecasting", The Journal of Business Forecasting Methods & Systems, Spring 2001, pp. 18-20, 3 pgs.

Notice of Allowance for U.S. Appl. No. 10/872,816, mail date Jun. 22, 2010, 16 pages.

Notice of Allowance for U.S. Appl. No. 10/900,995, mail date Mar. 31, 2011, 16 pages.

Office Action for U.S. Appl. No. 10/900,995, mail date Apr. 15, 2010, 14 pages.

Office Action for U.S. Appl. No. 10/931,936, mail date Sep. 22, 2010, 25 pages.

* cited by examiner

METHOD AND SYSTEM FOR AUTOMATED CONTROL OF PRICING

RELATED APPLICATIONS

This application claims the benefit of priority to U.S. Provisional Patent Application Ser. No. 60/551,221, filed on Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

A. Field of the Invention

The present invention is directed to the field of marketing of products and services and specifically to the automated control of the pricing of products and services.

B. Background

Effective pricing of products that are made available for sale is often a complicated task. In order to maximize profits, not only must revenue be optimized, but also the costs of inventory must be taken into account. One strategy used is to periodically reduce the price of the products or services, effecting a markdown, in order to encourage sales of the products or services. The amount of the markdown is often set by a sales agent who has had experience in the market for the products or services and can, using his or her experience and intuition determine the timing and amount of markdowns.

In particular, the sale of seasonal products poses a high financial risk for merchants. This risk is even more acute in the retail business. Each seasonal article can be assigned a specific sales period. When high-fashion and fashion articles are involved, the merchant wants to have as little remaining stock as possible at the end of the sales period, as it will be difficult to sell this merchandise even with markdowns. In this case, larger remaining stocks translate to higher losses. In addition to fashion articles, such as pink raincoats, this also applies to other products, such as computer hardware.

For less "fashionable" products, the risk is lower because merchants can store any remaining stock and then try to sell it at the normal price again in the same season of the next year. Because storing inventories is expensive, however, merchants will generally prefer to sell their merchandise by the end of the regular sales period.

Merchants use markdowns to ensure that the merchandise is sold out as completely as possible by the end of a season. Markdowns are price reductions or buyer's incentives aimed at promoting the sale of certain articles. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

As discussed above, effective pricing of products is a complicated task which is often performed manually. For example, price adjustments in planning decisions may be used using manual selection systems. Further, a sales promotion may also be implemented in a manual or automated process. A promotion refers to a special event, retail sale, or other activity designed to reduce inventory. For example, spring sales events, two-for-one promotions, end-of-the-season sales, clearance sales, etc. are examples of retail promotions which are utilized to reduce inventory. Sales promotions are different than a markdown controlling process which is not necessarily tied to an event or special circumstance.

Heretofore, a system for providing automated control of pricing of products and services has not been available. Specifically, in existing systems, one or more aspects of the pricing of products and services over the course of a season must be addressed manually. This is often tedious and time consuming and can lead to less than optimal pricing. There is a need for a single system that automatically controls the pricing of good and services that takes into account actual sales information, expected sales, historical sales data and other factors in order to automatically set and adjust pricing to achieve sales goals more effectively.

SUMMARY OF THE INVENTION

An embodiment of the present invention discloses a method, program product and system for automated control of pricing of a product or service. The method includes determining an initial price of the product, monitoring actual sales of the product at retail outlets, and adjusting the initial price during a selling season of said product based on the actual sales of the product. The method can further include accepting input from a historical price database, and determining the initial price using historical prices of the product or a similar product. The method can further include repeatedly adjusting a price of the product during a selling season based on the actual sales of the product. The method can further include applying a markdown to the price of the product and using a markdown profile to determine the markdown. The method can further include performing slow seller analysis to determine the markdown. The determination that a product is a slow seller can be made by applying a predetermined rule set to the product.

Other features and advantages of the present invention will become apparent to those skilled in the art from the following detailed description. It should be understood, however, that the detailed description and specific examples, while indicating exemplary embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF EXEMPLARY EMBODIMENTS

One of the features of an exemplary embodiment of the present invention is the automated control of pricing of products and services. This eliminates the need for making pricing decisions and adjustments manually. Using this embodiment, pricing is done more efficiently and more accurately.

The initial sale price of a given product or service is traditionally set manually based on a sales agent's experience and/or on a percentage markup over the cost to the retailer. Under an embodiment of the present invention, the initial sale price of the given product or service can be set by hand or can be set automatically by the system based on historical data. This historical data comprises past sale prices of the given product or service, or similar products or services. Such historical data on similar products and services is useful in establishing initial pricing for new products or services, that is, products and services that have not been sold before by the retailer.

During the course of a sales period or season, the sale price of a product or service may need to be adjusted one or more times in order to maximize sales and achieve certain sales quota. Under an embodiment of the present invention, these adjustments can be made automatically by the system. Due to the closed loop nature of the system under this embodiment, actual sales information is monitored and can be retrieved from computers at the various sales outlets during the course of a season. Using this information, the system can better determine an accurate price adjustment for the product or service. The automated pricing is based on actual sales, expected sales, the time period during which the product or service has been on sale at the current price or other prices and the time period remaining in the season. The adjusted price can be implemented via a data update transmitted to the computers at the relevant sales outlets.

One of the tools used by the system of an exemplary embodiment of the present invention to adjust prices of a product or service is the markdown profile. Using the markdown profile, the system can obtain proposed markdowns for a given product at periodic intervals over the life cycle of the sale of that product.

The system of the exemplary embodiment also, of course, accepts changes and updates from a user to the price of a given product or service.

The automated control of pricing under an exemplary embodiment can include the use of slow seller management in order to set pricing to achieve sales quotas The automated control of pricing under an exemplary embodiment can also include the use of a price planning system and method including automated price adjustment, manual price adjustment, and promotion management.

Figure 1:
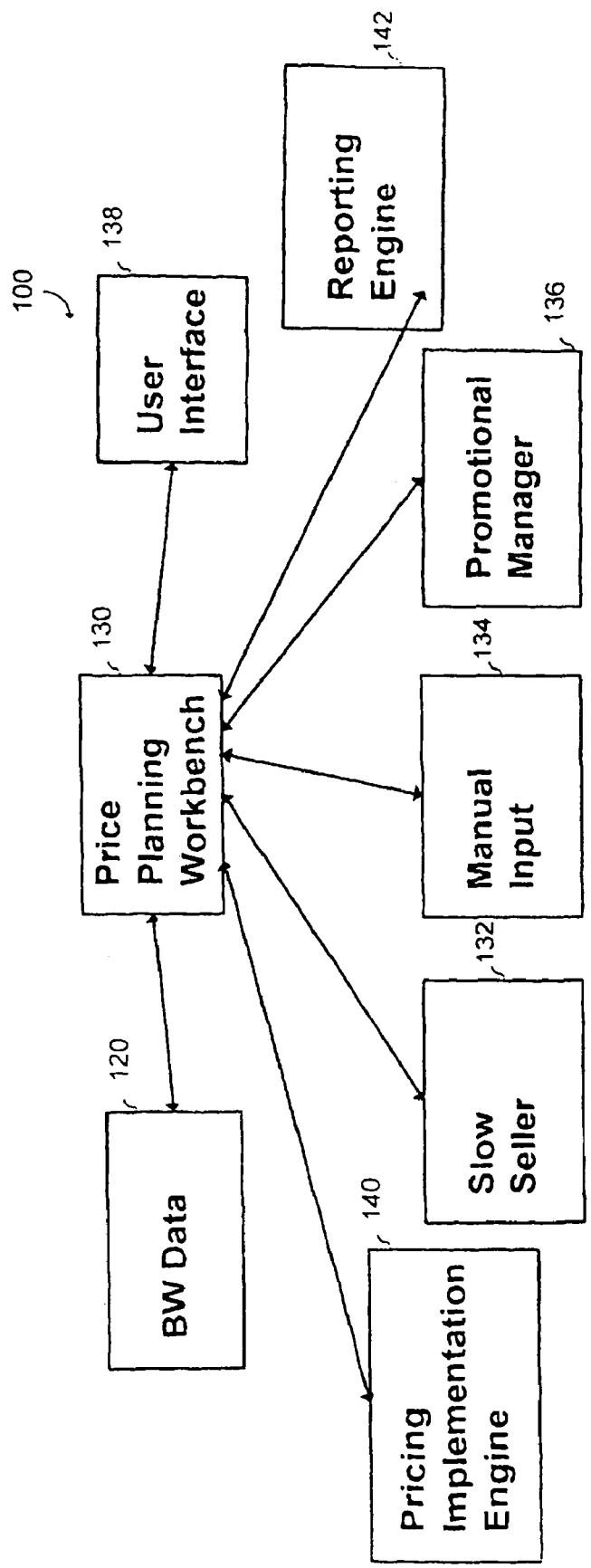
FIG. 1 is a block diagram illustrating an exemplary embodiment of a system for processing data related to retail operations and planning.

As discussed above, the automated system of an exemplary embodiment of the present invention uses feedback from the retail outlets to monitor actual sales. This information will affect how the system adjusts pricing. Referring now to FIG. 1, a general block diagram illustrates an exemplary embodiment of a planning system 100 for processing data related to retail operations and planning. Planning system 100 can be a closed loop retail planning system and preferably includes a data warehouse 120 and a price planning system 130. Planning system 100 is referred to below as retail planning system 100, and system 130 is embodied as a workbench in an exemplary embodiment.

According to an exemplary embodiment, retail planning system 100 may include additional components configured to manage and implement price planning for retail store operations. For example, retail planning system 100 may further include additional components such as a procurement engine, a supply engine, a merchandise controlling engine, a valuation engine, etc. The components of retail planning system 100 may further be interconnected such that information may be freely exchanged between the components of retail planning system 100. Preferably, information is exchanged through data warehouse 120.

Retail planning system 100 may further be associated with one or more additional external components such as a plurality of cash register systems associated with retail store locations. The cash register systems may be configured to perform a number of functions associated with retail store operation such as pricing implementation, inventory control, data management, etc.

Retail planning system 100 may be implemented as a single system, a distributed system, or any combination thereof. Retail planning system 100 may be implemented using a single computing system, a plurality of computing systems, software, hardware, or any other system or combination of systems to perform the functions described herein. Further, the components associated with system 100 may also be implement using single or multiple systems.

Data warehouse 120 is a data repository configured to receive, sort, and process information related to retail operations and planning. Data warehouse 120 may also be implemented using a single or multiple systems. Data warehouse 120 may further include one or more functions associated with it to permit a user to efficiently organize and retrieve stored data. It may also contain historical data on products and services such as past sales and prices. According to an exemplary embodiment, data warehouse 120 is an SAP Business Information Warehouse (BW) database provided by SAP. Such a data warehouse can be used to provide a basis for making strategic and operational decisions in companies. It includes preconfigured business content, and gives users a clear overview of company-internal data and any external data that is relevant. Such a data warehouse also contains a wide selection of predefined reports that are specially tailored to meet the needs of specific industry sectors and user groups, e.g. production planners, financial controllers, human resource managers.

Price planning system 130 is preferably a data processing system or software configured to control, display, interface with operators, or perform other operations to generate a price planning schedule. Although system 130 is preferably implemented in an SAP based system, interface, and architecture, any other systems may be utilized.

Price planning system 130 is a data processing system configured to allow a user to perform pricing tasks (e.g., receive price planning input data, access applicable budgeting data, generate a price planning schedule, implement the price planning schedule, etc.). According to an exemplary embodiment, price planning system 130 includes a slow seller management engine 132, a manual pricing engine 134, a promotion management engine 136, a user interface 138, and a pricing implementation engine 140. Communication with data warehouse 120 allows system 130 to obtain inventory data, as well as budget data. Inventory and budget data can be used by engines 132, 134 and 136 for providing price planning information.

A price planning schedule may be implemented by a data structure configured to contain information related to one or more price changes. Dates or timing for the price changes can be included but is not necessary in the schedule. The price changes may include a price change by specifying a new sales price, a percentage change based on the original or current sales price, or an absolute price change by specifying a difference from the original or current sales price. Further, the price planning schedule may include other information associated with the price change such as timing information, quantity limits, automatic versus manual implementation, associated articles, etc.

Price planning system 130 is generally configured to enable a user to take corresponding budget data into account in planning and activating price changes to create a price planning schedule based on pricing input information. During the creation of the price planning schedule, an initial budget planning value may be created representing an effect on the corresponding budget.

Subsequently, upon activation of the price changes during defined validity dates, the corresponding budget may be updated based upon actual sales occurring under the price planning schedule and/or forecasted sales. During the process of updating, the initial budget planning value may be compared with a budget usage resulting from implementation of the price planning schedule and involved article quantities.] Advantageously, implementing a price planning schedule in conjunction with a corresponding budget enables cost control for any price reductions.

In one exemplary embodiment, price planning system 130 can include a menu for providing changes to various price planning criteria. Changes can be made to mark downs, manual price changes, and promotions. Further, a price plan overview can be selected via system 130.

The price plan overview can provide the status of markdowns, manual price changes, and promotions. The changes can be arranged in folders related to status. The folders can be labeled status create, status in process, status released, status conditioned created (price change), status active, status temporary in process, status temporary conditions (price change) created, and status temporary release. The folders can be organized under each of markdowns, manual price changes, and promotions. The folders contain information on the articles in each status category. Status released, status temp in process, and status temp released folders can contain the price planning document associated with the change.

System 130 can also include a screen providing article information in columns in the edit area in one exemplary embodiment. The columns can include a budget indicator indicating whether the anticipated budget for the article is above, below or adequate. The columns can also include a reference to the type of article (e.g., beach article, casual article, etc.), the planned budget, the fashion type of the article, the general material of the article, the quantity of the general material, the percentage of the markdown profile, the original price, the final price, the sales price (gross), and the quantity of the article. The article view is preferably a summary display for article quantities and budget values that are arranged hierarchically by the relevant organizational levels to the extent possible. The initial level of the edit area of system 130 is preferably set to the article view aggregated by organizational level.

Generally, engines 132, 134, and 136 communicate with price planning system 130 either directly or as a downstream process. System 130 is configured to interface with each engine using custom information for that engine (for example, a slow seller management system). According to an alternative embodiment, engines 132, 134 and 136 may be implemented as components within price planning system 130.

Slow seller management engine 132 may be a system configured to communicate with one or more of a budgeting system, a planning system, an inventory system, or any other systems within or in communication with system 100. According to an exemplary embodiment, slow seller management system 132 is configured to identify and recommend pricing or other strategies for products or inventory that are selling at a slower rate than forecast. Pricing strategies may include recommended markdowns to increase sales rate.

Manual pricing engine 134 may be any system or method for generating price planning input based on manual input received from a user. According to an exemplary embodiment, a user may utilize a user interface associating with manual pricing engine 134 or user interface 138 for price planning system 130 to enter one or more price changes such as a new sales price, a percentage change based on the original or current sales price, or an absolute price change by specifying a difference from the original or current sales price. The user may further enter any associated information such as timing information, quantity information, store location information, etc.

Promotion management engine 136 may be any system or method for generating price planning input based upon one or more promotions. A promotion may be a promotion associated with a particular store, a chain of stores, a particular article, a line of articles, a geographic location or region, etc. A promotion may include a price change, timing information, article information, store location, or any other information related to the promotion to be implemented.

User interface 138 may be any type of interface configured to allow a user to interact with price planning system 130 and/or any associated components such as slow seller management engine 132, manual pricing engine 134, and promotion management engine 136. Interface 138 may be configured such that each user is assigned to one or more specific budgets, which in turn are assigned to specific articles. Advantageously, user assignments may be used to define the set of articles that a user is authorized to process. Interface 138 may further be configured to display the status of a price planning schedule during any stage of preparation and/or implementation.

Pricing implementation engine 140 may be any type of system or method configured to receive a price planning schedule and communicate with one or more components associated with retail planning system 100 to implement price changes defined in the price planning schedule. Pricing implementation engine 140 may be further configured to implement functions associated with the price changes such as budgets updates, inventory tracking, etc.

According to alternative embodiments, price planning system 130 may include more, fewer, or different systems than described above to facilitate creation, processing, and maintenance of a price planning schedule. In addition, functions associated with one or more systems described above may alternatively be associated with one or more alternative systems. For example, manual pricing engine 134 may be implemented as a component within promotion management engine 136.

As mentioned above, one of the primary goals in managing seasonal merchandise and services is to limit markdowns to a minimum and to apply them at the best suitable time, while ensuring that nearly all the merchandise is sold by the end of the season. An advantageous tool or system is described herein that supports a pricing agent's work during the ongoing season, such as a retail season. The agent forms a correspondence between an article and a markdown profile. This markdown profile contains time-specific target data for selling an article during its retail life cycle. The sales data of an article that sold well in the previous year, for example, could be used as the target sales quota in a markdown profile. The markdown profile is tied to a pricing strategy, which dictates specific price reductions when the actual sales data deviates from the target data. As a result, the system is capable of monitoring the sales data automatically and notifying the agent of any exceptions that occur. In addition, the system can propose certain markdowns in order to reach the planned sales figures. In this approach, the agent is relieved from a large portion of the activities he or she usually has to perform.

Using the markdown profile, the agent can obtain proposed markdowns for a given product at periodic intervals over the life cycle of the sale of that product. The agent can choose to accept or reject the proposals, but it is envisioned that in most cases, the proposals will be accepted and the goal of ensuring that nearly all the merchandise is sold by the end of the season is achieved.

Figure 4:
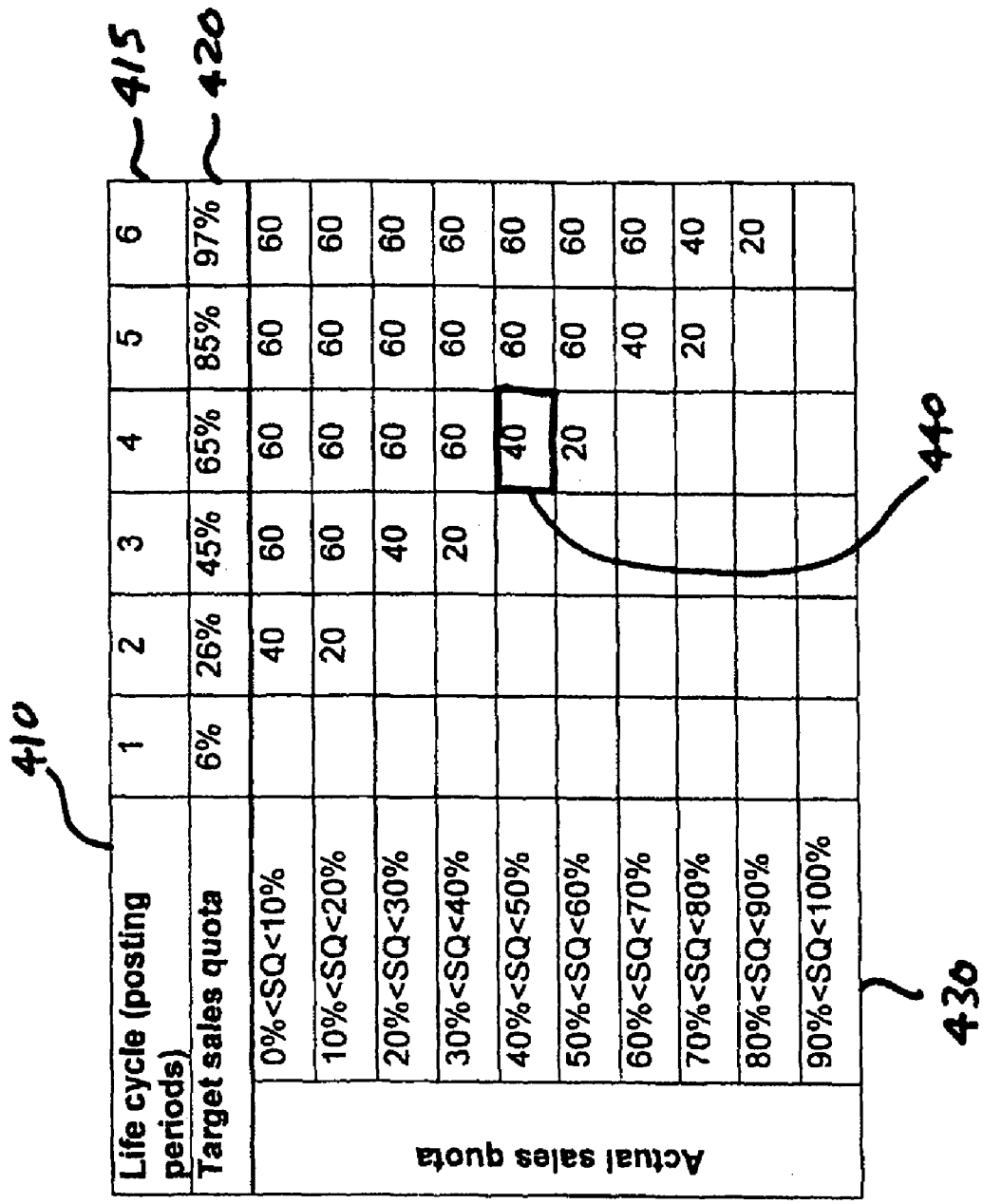
FIG. 4 illustrates a markdown profile in accordance with an exemplary embodiment of the invention.

The structure of a markdown profile 410 in an exemplary embodiment of the present invention is illustrated in FIG. 4. Markdown profile 410 specifies the target sales figures for a product or service, that is, the sales quotas for which no markdowns are needed. These target sales quotas are shown in a row 420 in FIG. 4. The target sales quotas are shown in connection with a time reference, which may represent a retail life cycle of the product. In FIG. 4, the target sales quotas 420 are shown in connection with corresponding numbered time periods 415 over the life cycle of the product, also known as posting periods. For example, a posting period may correspond to a week in the season of the product.

The target sales quotas in row 420 are expressed as percentages in markdown profile 410 shown in FIG. 4. These percentages represent the quantity of the products sold divided by the quantity of the products available for sale. Thus, in the example shown in FIG. 4, at the end of the first posting period the target sales quota is six percent. At the end of the second posting period the target sales quota is 26 percent. By the end of the sixth posting period, most of the retail product, that is 97 percent, is targeted to have been sold. As shown in markdown profile 410 in FIG. 4, these target sales quotas are arranged along an axis in the table. Arranged perpendicular to the target sales quota axis is a plurality of rows representing ranges of actual sales quotas. These are shown in a column 430 in FIG. 4. As with target sales quota, actual sales quota is calculated by taking the actual quantity of products sold and dividing it by the quantity of products available for sale. Each of the ten ranges of actual sales quota shown in column 430 represent 10 percent intervals. It would be apparent to one skilled in the art that any number of ranges or actual percentages could be used. The thresholds for the actual sales quota can be freely defined by the user.

In markdown profile 410, at the intersection of each actual sales quota range 430 and each target sales quota 420 corresponding to a posting period 415 lies a cell which contains the proposed markdown. Cells in which no numbers appear indicate that no markdown is proposed. For cells in which numbers do appear, the number indicates the proposed markdown percentage. For example, assume that markdown profile 410 shown in FIG. 4 is being used for a retail product that has been on sale for four posting periods (or four weeks). The sales quota targeted for this product is 65 percent, as shown in target sales quota row 420. Now assume that sales of this product have not met the targeted sales quota and, instead, only 235 out of the 500 items that were in stock have sold. This corresponds to an actual sales quota of 47 percent. Thus, using the markdown profile with the actual sales quota of 47 percent falling within the range of 40 percent to 50 percent, we look to the cell found at the intersection of this actual sales quota range with the target sales quota column of 65 percent and find the number 40 in cell 440. This indicates a proposed markdown of 40 percent.

Thus, in the example described above, the system would indicate to the user that a markdown of 40 percent of the original retail price is proposed. The user can then accept or reject this proposal. In an alternate embodiment of the invention, the proposed markdown from the markdown profile is automatically implemented to adjust the retail price of the product. The user can override this automatic adjustment. The process is repeated at subsequent posting periods over the retail life cycle of the product.

While percentage markdowns are shown in markdown profile 410 illustrated in FIG. 4, it is envisioned that other types of buying incentives could be used instead of a simple percentage markdown of retail price. For example, a markdown profile could propose a distribution of a coupon in order to encourage sales to achieve the target sales quota.

It is important to note that the computer system on which the markdown profile is running and implemented has access to the data necessary to propose the markdown to the user. That is, the system has access to the actual sales from the relevant store or stores for the relevant product or products during the relevant posting periods. It is envisioned that multiple markdown profiles would be provided to the user. These multiple profiles would correspond to different types of products or perhaps would be specific to individual products. The user could also create new profiles or revise existing profiles as desired.

To better control pricing for the sale of a retail product using markdown profiles, a user may select a markdown profile to be used for the retail product at issue. The user may also select the initial retail price for that product and, as time progresses, adjust the retail price of that product by the markdown determined from the markdown profile as described above. This adjustment could happen multiple times over the life cycle of the product. The system may be programmed to perform the adjusting step at regular intervals such as at the end of each posting period. In this case, it is envisioned that for a product selling well no mark-down may be necessary under certain posting periods.

Not shown in FIG. 4 is a data field associated with a markdown profile that pertains to some product characteristic. This data field allows for a markdown profile to be identified as relevant to a specific retail product or to a specific category of retail products. The assignment of a markdown profile to a retail product or products is described in further detail herein.

As mentioned above, the user forms a correspondence between a product or service to be sold and a markdown profile. In an exemplary embodiment of the present invention, the user is provided with a plurality of markdown profiles from which to choose in order to select a markdown profile to be used for a particular product. These markdown profiles are prepared in advance of selection. Alternatively, the user can revise an existing markdown profile or even create an entirely new markdown profile to be used for the particular product.

In order to more efficiently search for potentially applicable and relevant markdown profiles, the markdown profile may contain at least one and possibly three or more assignable attribute fields. These fields contain attribute data regarding a product or service. For example, the fields may contain indicators representing the product type (e.g., raincoats), the color, the size, the sales organization, and the distribution channel. Also, markdown profiles can be differentiated by the applicable sales season or as otherwise desired. Using the attribute field information, the user can search for the markdown profile that best suits the user's need for a particular product or service.

A given markdown profile can also have multiple versions to address different reaction strategies and sales profiles. For example, three or more reaction strategies could be provided: aggressive, defensive and normal. As another example, three or more sales profiles could be provided (such as linear, progressive and declining profiles).

When selecting from among a plurality of markdown profiles, the user may toggle between them using a single action of a user-input device, such as a pressing a key on a keyboard. This single action may toggle between multiple markdown profiles. In the case of reaction strategies and sales profiles, the single action may toggle between the various versions of the markdown profile.

In forming the correspondence between products or services and markdown profiles, the user can assign a markdown profile to entire groups or categories of products or services. For example, one markdown profile can be assigned to all products of a particular type (e.g., raincoats). The user can also more finely correspond specific markdown profiles to sub-groupings of those products. For example, the user could assign a different markdown profile to red raincoats than is assigned to blue raincoats and different than is assigned to the larger category of all raincoats. Indeed, a markdown profile may be specifically tailored for a particular product of a particular color and size. In an exemplary embodiment, if an individual product is not separately assigned a specific markdown profile, then the markdown profile for the relevant larger product category may be used for that product.

While the markdown profile in FIG. 4 is shown as a table, it would be apparent to one skilled in the art that other configurations could be used to convey the same information. Furthermore, the markdown profiles can represent information about the sales of a product or service in a given store or for a group of stores. It could also represent information about the sales of a group or category of products or services.

It is envisioned that a company will have in place limited budgets for applying markdowns to the retail prices of products or services. A company may not wish to allow its agents to markdown prices of products or services by significant amounts and for extended periods of time. Accordingly, they may put in place limited markdown budgets for a given product or group of products. In an embodiment of the present invention, when a markdown is proposed, this budget will be checked in order to prevent application of markdowns that will exceed the budgeted amount. In this way, some additional control is exerted over the agents and some additional safety measures are placed on the operation of the system.

Figure 2:
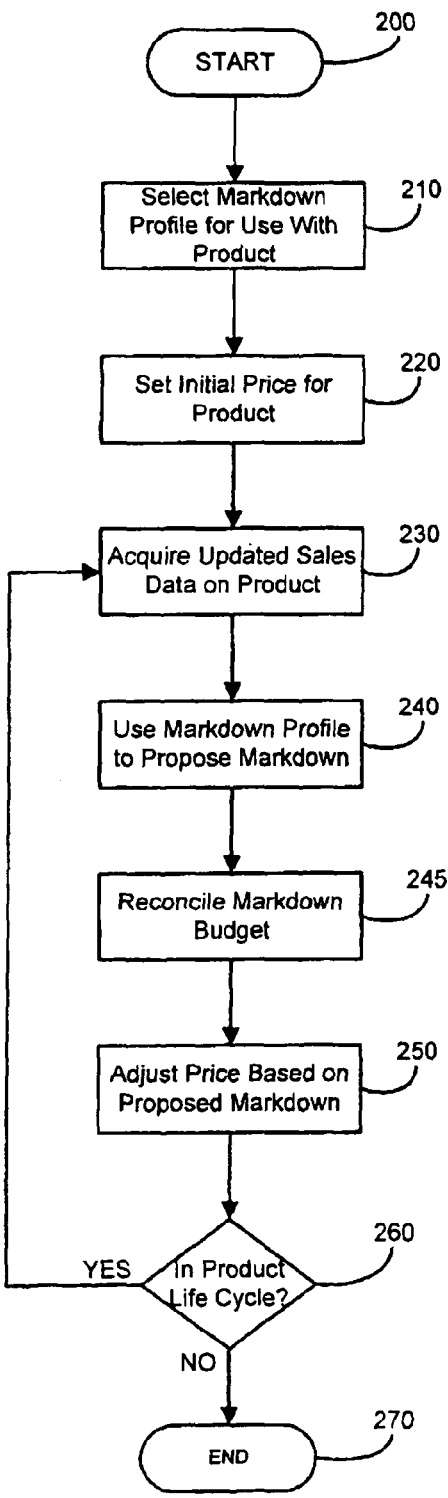
FIG. 2 is a flowchart illustrating basic price control and modification under an embodiment of the present invention.

FIG. 2 is a flow chart illustrating one embodiment of the present invention with a focus on markdown budget reconciliation. The flowchart begins at a step 200. In a step 210, the user or the system selects a markdown profile to be used for a retail product. In a step 220, which may be performed before, after or contemporaneously with step 210, the initial retail price of the product is set. A step 230 illustrates the acquisition of updated sales data after some period of time has elapsed while the product has been on sale. This sales data is used in a step 240 in the markdown profile to determine the proposed markdown for the retail product.

In the illustrated embodiment, before a proposed markdown is applied to adjust the retail price of a product, a reconciliation of the markdown budget is performed based on the proposed markdown. This shown in a step 245 in FIG. 2. During this reconciliation, the system determines whether, based on predetermined budget rules, a proposed markdown can actually be applied to adjust the retail price of a product. This determination is made based on whether application of the proposed markdown would result in exceeding the available markdown budget. The predetermined budget rules may include some tolerance factor such that if the budget is exceeded but within the tolerance, it would still allow the markdown to be applied.

If it is determined during reconciliation step 245 that a proposed markdown can indeed be applied to the retail price of a product, the price is then adjusted based on the proposed markdown as shown in a step 250. If it is determined during reconciliation step 245 that a proposed markdown cannot be applied to the retail price of a product, then the proposed markdown is not applied to adjust the price of the product. In an alternate embodiment of the invention, the system would calculate the amount of markdown that could be applied while still complying with the predetermined rules regarding the available markdown budget. This allowable markdown could then be applied to adjust the retail price of the product.

In another embodiment of the invention, the proposed markdown is subject to approval or rejection by a user and, in the case of rejection, adjustment step 250 need not be performed. In any event, the exemplary method returns to acquiring updated sales data in step 230 so long it is still within the product lifecycle as determined in a step 260. The frequency of acquiring updated sales data and determining a markdown can be adjusted by the user. In an exemplary embodiment, it is performed once per posting period. Once the life cycle of the product has been exhausted, it is assumed that the product will not be offered for sale until some later time, if at all, and the use of the markdown profile is ended in a step 270.

A slow seller, in accordance with one embodiment of the present invention, is a product or service that is selling more slowly than anticipated or that is selling at a pace where it becomes unlikely that a target sales quota will be reached. It is important to be able to identify such products and services quickly during a sales cycle and to take remedial measures to improve sales or minimize the negative effects of the lagging sales.

Figure 3:
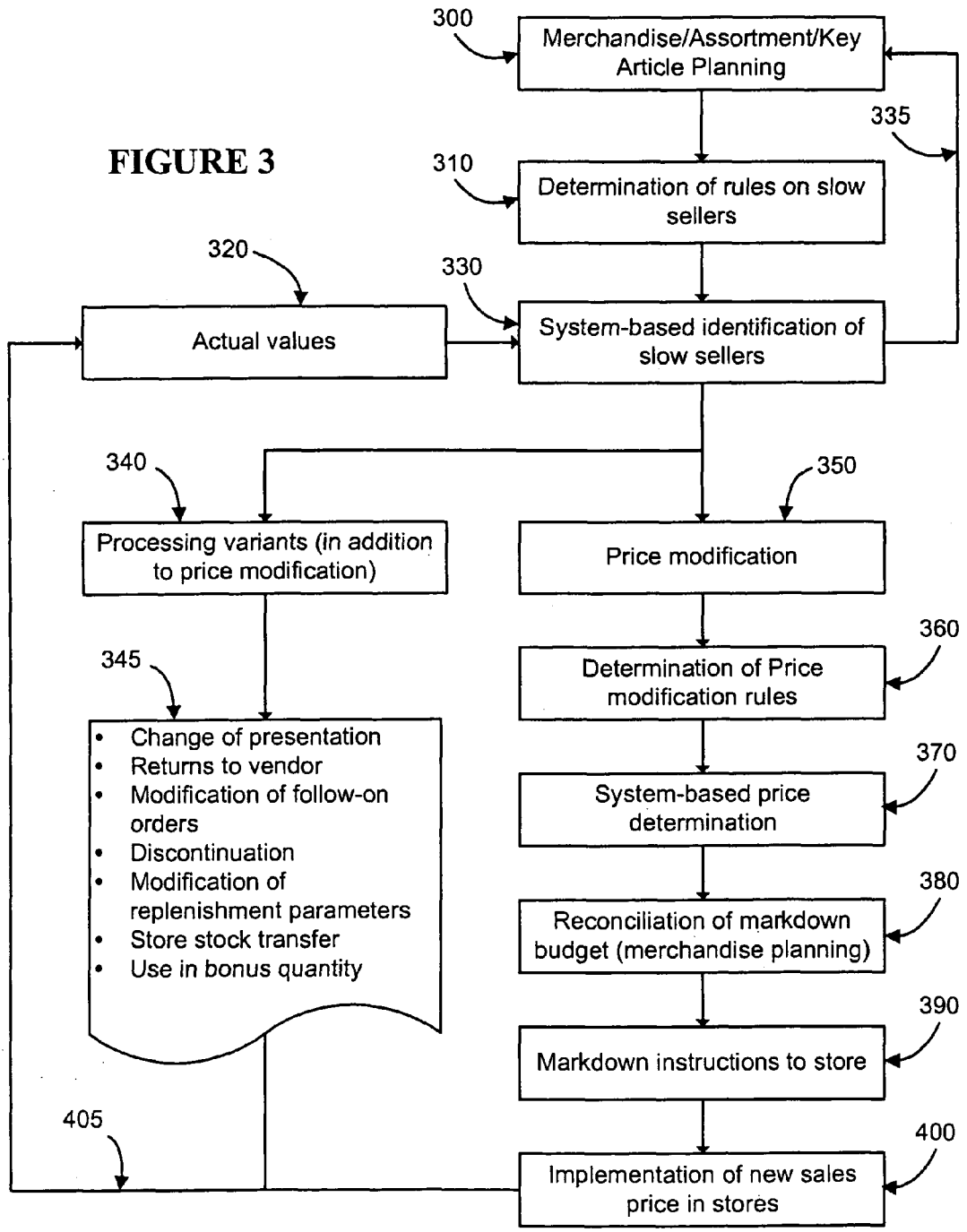
FIG. 3 is a flowchart illustrating slow seller management techniques under an embodiment of the present invention.

FIG. 3 is a flow chart illustrating slow seller management techniques under an embodiment of the present invention. Slow seller management begins with merchandise and assortment planning as shown in a step 300. Merchandise and assortment planning refers to the general distribution of products and services selected for marketing by a retailer or other entity. An assortment plan provides information such as the identification of the products and services, the quantities, the colors, the sizes, other characteristic traits, the location of products, the target customers, the time frame for marketing such products and services, the length of time they should be offered, anticipated sales curves, target inventory stocks, and costs incurred from inventory.

Initially, slow seller management is based on default values from the merchandise and assortment planning. The default values include inventory turnover, sales curves, target stocks, and costing incurred for a specific product or service or category of products or services. The next step in the slow seller management system and method is a determination of what set of rules to apply to determine slow sellers, shown as a step 310 in FIG. 3. To determine a slow seller, that is a product or service that is selling more slowly than anticipated or too slowly to reach target quotas, it is envisioned that such information as past sales, inventory or stock values, and the accrued cost of inventory will be analyzed. Using such factors, slow sellers can be identified.

Of course, many different sets of rules using any combination of the above or other factors can be established. Indeed, different categories of products and services may have different sets of rules used to determine slow sellers. For a specific category of products or services, multiple sets of rules may be applied that vary depending on how aggressively the user wants to manage the inventory.

In addition, the determinations in step 310 include determining the frequency with which the slow seller determination is carried out, the timing of such determination, and as briefly addressed above the determination of what indicators and what selection criteria to use.

A step 320 in FIG. 3 shows the introduction of actual values, that is, the actual sales figures from the various stores (not shown), into the slow seller management system. These actual values are used in a step 330 for the system to identify slow sellers based on the rules set forth in step 310.

Once one or more slow sellers have been identified in step 330, the slow seller management system and method proceeds to a processing variants step 340 that implements non-price related modifications to help increase sales of the products or service or to minimize the negative effects caused by the lagging sales. These non-price related remedial measures may include, as shown in a step 345, a change in the presentation of such products or services, effecting returns of such products to vendors, modification of follow-on orders, discontinuation of the products or services, modification of replenishment parameters, transfer from one store to the other of existing inventory, and the use in bonus quantity.

In addition to the exemplary remedial measures discussed with respect to steps 340 and 345, the main remedial measure in slow seller management may be price modification as shown in step 350. Price modification can be performed in place of or in addition to the remedial measures discussed with respect to steps 340 and 345. In accordance with an exemplary embodiment of the present invention, when a slow seller has been identified, active steps are taken to modify the price of the corresponding products and services in order to secure planned sales and reach targeted ending stock. Price modification is based on a set of previously defined rules that is used to determine the articles to be marked down, by how much, and the new sales price, taking into account existing prices. An example of a set of such markdown rules is the use of the markdown profile as described herein.

A step 360 illustrates the determination of what price modification rules to apply. One example of this is the determination of what markdown profile to use based on what markdown profile or profiles have been assigned to the product or service in question that has been identified as a slow seller.

In a step 370, the system makes a price modification determination based on the determined price modification rules, for example the markdown profile. The resulting impact on sales is then simulated using the modified pricing. These results are then reconciled with the markdown budget in a step 380 as described in greater detail below.

Upon reconciliation with the markdown budget, if it is determined that the price modification can be made in a step 390, the markdown instruction is sent to the store or stores where the products or services are sold. Then, in a step 400, the modified pricing is implemented in the stores for subsequent sales of the products or services. The expectation is that the modified pricing will spur sales of the slow seller. Subsequent sales will affect the actual values being entered into the slow seller management system and method and will cause a revision, if necessary, to the pricing, based on the rules and their application as set forth above.

A slow seller management process such as described provides several feedback loops that may be used to manage slow sellers in both the current season and subsequent seasons. For example, the modified prices implemented in the stores in step 400 may result in relatively rapid changes in actual values (e.g., increased sale quantities) which are provided by step 320 to step 330 for additional slow seller determinations in the current season. This inter-seasonal feedback is indicated by a line 405 between steps 400 and 320. Moreover, the results of slow management may also be incorporated into the planning for subsequent seasons. For example, when items sell slowly in one season it may be desirable to ordered smaller quantities of those articles for the next season. This intra-seasonal feedback is shown by a line 335 between steps 330 and 300. Another feedback loop that may exist in an exemplary slow seller process is between markdown budget reconciliation step 380 and slow seller rules determination step 310. For example, the rules for slow sellers may be determined in step 310 based in part on the amount or size of the available budget for markdown, which available budget may be impacted upon implementation of steps 350-380.

"Article," "seasonal product," "product" and "retail product" are terms used herein to refer to the merchandise being sold, the pricing for which is controlled or affected by the markdown profile as described above. It is envisioned that the systems, methods and tools described herein will be applicable to the sale of any type of product or service. Hence, the term "product" herein is intended to encompass a service. Furthermore, the slow seller management method as described above is preferably implemented on one or more computers.

Articles can be hierarchically arranged. Article hierarchies can include designations such as, fashion, which in turn includes groups of articles by store, by department, by division, by more detailed definition of the article, etc. For example, fashion can include groups of articles, including men's wear, ladies' wear, casual wear, beach wear, etc. Further, these articles can be arranged underneath a type of department for the store which is under the fashion category. In another embodiment, the groups of articles by store can include a list of types of articles, such as beach, casual, outdoor, etc. These article hierarchies can be arranged in tree form for viewing on a display.

Articles can be selected according to the designation discussed above. An identifier for each designation can be used to track other data about the designation including date ranges for the article's budgets, etc.

As noted above, exemplary embodiments of the present invention may include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The exemplary embodiments of the present invention are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The exemplary embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of embodiments of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

What is claimed is:

1. An automated method of controlling pricing of a product, comprising:
    determining, using a computing system, a markdown profile associated with the product, the markdown profile including a plurality of proposed markdowns, wherein each proposed markdown in the plurality of markdowns is associated with a predetermined time period during a sales period of the product and wherein each proposed markdown is related to a difference between a target sales quota and an actual sales quota at the time period with which the proposed markdown is associated, and wherein the markdown profile is established prior to the sales period of the product;
    determining, using the computing system, an initial price of the product;
    monitoring, using the computing system, actual sales of the product at retail outlets;
    for each time period within the sales period, comparing, using the computing system, the actual sales of the product to target sales of the product associated with the respective time period;
    for one or more time periods within the sales period, determining, using the computing system, that the product is a slow selling product based on the comparison of the actual sales of the product to target sales of the product for the respective time periods;
    for each of the one or more time periods for which the product is determined to be a slow selling product, selecting, using the computing system, a proposed markdown from among the plurality of proposed markdowns of the markdown profile based on the comparison of the actual sales and the target sales and the determination that the product is a slow selling product;
    reconciling, using the computing system, a markdown budget based on the proposed markdown;
    adjusting, using the computing system, the initial price based on the proposed markdown during a selling season of the product based on the reconciliation using a computerized system for controlling pricing of the product;
    adjusting, using the computing system, a replenishment parameter for the product based on the determination that the product is a slow selling product; and
    storing, in a memory, at least one of an adjusted price and an adjusted replenishment parameter.

2. The automated method of controlling pricing of a product according to claim 1, wherein the step of determining an initial price of the product further comprises:
    accepting input from a historical price database; and
    determining the initial price using historical prices of the product or a similar product.

3. The automated method of controlling pricing of a product according to claim 1, further comprising repeatedly adjusting a price of the product during the selling season based on the actual sales of the product.

4. The automated method of controlling pricing of a product according to claim 1, wherein a slow seller analysis is performed to determine the proposed markdown.

5. The automated method of controlling pricing of a product according to claim 1, wherein the step of determining that the product is a slow seller further comprises applying a predetermined rule set to the product.

6. The automated method of controlling pricing of a product according to claim 1, further including monitoring a time period during which the product has been on sale at the initial price, and wherein the step of adjusting the initial price is based on the time period.

7. An automated method of controlling pricing of a product, comprising:
   determining, using a computing system, a markdown profile associated with the product, the markdown profile including a plurality of proposed markdowns, wherein each proposed markdown in the plurality of markdowns is associated with a predetermined time period during a sales period of the product and wherein each proposed markdown is related to a difference between a target sales quota and an actual sales quota at the time period with which the proposed markdown is associated, and wherein the markdown profile is established prior to the sales period of the product;
   monitoring, using the computing system, actual sales of the product at retail outlets by accepting actual sales data from a plurality of retail outlet computers;
   for each time period within the sales period, comparing, using the computing system, the actual sales of the product to target sales of the product associated with the respective time period;
   for one or more time periods within the sales period, determining, using the computing system, that the product is a slow selling product based on the comparison of the actual sales of the product to target sales of the product for the respective time periods;
   for each of the one or more time periods for which the product is determined to be a slow selling product, selecting, using the computing system, a proposed markdown from among the plurality of proposed markdowns of the markdown profile based on the comparison of the actual sales and the target sales and the determination that the product is a slow selling product;
   reconciling, using the computing system, a markdown budget based on the proposed markdown;
   adjusting, using the computing system, a replenishment parameter for the product based on the determination that the product is a slow selling product;
   adjusting, using the computing system, a retail price of the product during a selling season of the product using a computerized system for controlling pricing of the product based on the reconciliation by sending a price update to the plurality of retail outlet computers; and
   storing, in a memory, an adjusted retail price for at least one product.

8. An automated system for controlling pricing of a product, comprising:
   one or more processors; and
   one or more computer-readable media having instructions stored thereon that, when executed by the one or more processors, are configured to implement:
      an initial price determination engine configured to determine the initial price of the product;
      an actual sales monitoring engine configured to monitor actual sales of the product at retail outlets;
      a price adjustment engine configured to:
         determine a markdown profile associated with the product, the markdown profile including a plurality of proposed markdowns, wherein each proposed markdown in the plurality of markdowns is associated with a predetermined time period during a sales period of the product and wherein each proposed markdown is related to difference between a target sales quota and an actual sales quota at the time period with which the proposed markdown is associated, and wherein the markdown profile is established prior to the sales period of the product,
         for each time period within the sales period, comparing the actual sales of the product to expected sales of the product associated with the respective time period;
         determine, for one or more time periods within the sales period, that the product is a slow selling product based on the comparison of the actual sales of the product to the expected sales of the product for the respective time periods,
         selecting, for each of the one or more time periods for which the product is determined to be a slow selling product, a proposed markdown from among the plurality of proposed markdowns of the markdown profile based on the comparison of the actual sales and the expected sales;
         adjust a replenishment parameter for the product based on the slow selling product determination,
         adjust the initial price during a selling season of the product based on the comparison and a slow selling product determination,
         determine a markdown to be applied to a price of the product based on the markdown profile, and
         reconcile a markdown budget with the determined markdown to be applied to the price to determine whether the markdown will be applied and adjust the price of the product by the markdown based on the reconciliation;
      a display configured to display a first data group and a second data group, the first data group including a budget, an original price, a final price, and a product quantity, the second data group including at least one of a gross price, a reference to the type of article, a fashion type of the article, a delta budget, a percentage of markdown profile, and a general material of the article; and
      a memory configured to store an adjusted price.

9. The automated system for controlling pricing of a product according to claim 8, the initial price determination engine is further configured to:
   accept input from a historical price database; and
   determine the initial price using historical prices of the product or a similar product.

10. The automated system for controlling pricing of a product according to claim 8, wherein the price adjustment engine is further configured to repeatedly adjust a price of the product during the selling season based on the actual sales of the product.

11. The automated system for controlling pricing of a product according to claim 8, wherein the price adjustment engine is further configured to perform a slow seller analysis to determine the markdown.

12. The automated system for controlling pricing of a product according to claim 8, wherein the price adjusting engine is further configured to determine that the product is a slow seller by applying a predetermined rule set to the product.

13. The automated system for controlling a pricing of a product according to claim 8, wherein the price adjusting engine is further configured to monitor a time period during which the product has been on sale at the initial price to determine whether the product is a slow seller.

14. An automated system for controlling pricing of a product, comprising:
    means for determining a markdown profile associated with the product, the markdown profile including a plurality of proposed markdowns, wherein each proposed markdown in the plurality of markdowns is associated with a predetermined time period during a sales period of the product and wherein each proposed markdown is related to a difference between a target sales quota and an actual sales quota at the time period with which the proposed markdown is associated, and wherein the markdown profile is established prior to the sales period of the product;

means for determining an initial price of the product;

means for monitoring actual sales of the product at retail outlets;

means for comparing, for each time period within the sales period, the actual sales of the product to target sales of the product associated with the respective time period;

means for determining, for one or more time periods within the sales period, that the product is a slow selling product based on the comparison of the actual sales of the product to target sales of the product for the respective time periods;

means for selecting, for each of the one or more time periods for which the product is determined to be a slow selling product, a proposed markdown from among the plurality of proposed markdowns of the markdown profile based on the comparison of the actual sales and the target sales and the slow selling product determination;

means for adjusting a replenishment parameter for the product based on the slow selling product determination;

means for reconciling a markdown budget based on the proposed markdown;

means for adjusting the initial price during a selling season of the product based on the reconciliation; and means for storing an adjusted price for at least one product.

15. One or more non-transitory machine-readable media having program code stored thereon for causing, when executed, one or more machines to perform a method of controlling pricing of a product, the method comprising:

determining a markdown profile associated with the product, the markdown profile including a plurality of proposed markdowns, wherein each proposed markdown in the plurality of markdowns is associated with a predetermined time period during a sales period of the product and wherein each proposed markdown is related to a difference between a target sales quota and an actual sales quota at the time period with which the proposed markdown is associated, and wherein the markdown profile is established prior to the sales period of the product;

determining an initial price of the product;

monitoring actual sales of the product at retail outlets;

for each time period within the sales period, comparing the actual sales of the product with target sales of the product associated with the respective time period;

generating selecting, for each of the one or more time periods, a proposed markdown from the markdown profile based on the actual sales versus target sales comparison;

reconciling a markdown budget based on the proposed markdown;

when a reconciliation of the markdown budget is successful, adjusting the initial price during a selling season of the product based on a successful reconciliation of the markdown budget using a computerized system for controlling pricing of the product;

when the reconciliation of the markdown budget is unsuccessful, denying an adjustment of the initial price during the selling season of the product based on an unsuccessful reconciliation of the markdown budget using the computerized system for controlling the pricing of the product; and storing at least one of the initial price and an adjusted price for at least one product.

* * * * *